(12) United States Patent
Kudo et al.

(10) Patent No.: US 8,567,908 B2
(45) Date of Patent: Oct. 29, 2013

(54) LIQUID SUPPLY MEMBER, MANUFACTURING METHOD OF LIQUID SUPPLY MEMBER, LIQUID DISCHARGE HEAD, AND MANUFACTURING METHOD OF LIQUID DISCHARGE HEAD

(75) Inventors: Kiyomitsu Kudo, Machida (JP); Osamu Morita, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/898,197

(22) Filed: Oct. 5, 2010

(65) Prior Publication Data

US 2011/0115850 A1    May 19, 2011

(30) Foreign Application Priority Data

Nov. 18, 2009   (JP) .................................. 2009-262998

(51) Int. Cl.
*B41J 2/135*    (2006.01)
*B41J 2/175*    (2006.01)

(52) U.S. Cl.
USPC ............................................... 347/44; 347/85

(58) Field of Classification Search
USPC .................................................. 347/44, 65, 84
See application file for complete search history.

(56) References Cited

U.S. PATENT DOCUMENTS

2005/0068381 A1    3/2005   Morita

FOREIGN PATENT DOCUMENTS

JP    2005-096422 A    4/2005
JP    2007-283668 A    11/2007

*Primary Examiner* — Lisa M Solomon
(74) *Attorney, Agent, or Firm* — Fitzpatrick, Cella, Harper & Scinto

(57) ABSTRACT

A liquid supply member for supplying a liquid to a liquid discharge head having a discharge port which discharges a liquid, includes: a first member consisting of a resin material; a second member consisting of a resin material; and a supply path formed by joining the first member and the second member to each other, the supplying path supplying a liquid to the liquid discharge head, wherein at least a part of an internal surface of the supply path is a smooth surface smoothed by melting the resin after being molded.

5 Claims, 10 Drawing Sheets

LIQUID SUPPLY MEMBER, MANUFACTURING METHOD OF LIQUID SUPPLY MEMBER, LIQUID DISCHARGE HEAD, AND MANUFACTURING METHOD OF LIQUID DISCHARGE HEAD

BACKGROUND OF THE INVENTION

1. Field of the Invention

The present invention relates to a liquid supply member for supplying liquid to a liquid discharge head which discharges liquid, a manufacturing method of a liquid supply member, a liquid discharge head for discharging liquid, and a manufacturing method of a liquid discharge head.

2. Description of the Related Art

As a liquid discharge head for discharging liquid to be recorded on a recording medium, an ink jet recording head for discharging ink is known. A liquid supply member has a supply path for supplying liquid to a discharge port which discharges liquid and is used for, for example, an ink jet recording head.

FIGS. 9A to 9C are diagrams illustrating a configuration of a conventional ink jet recording head.

FIG. 9A is an exploded perspective view of the conventional ink jet recording head. An ink jet recording head H1001 illustrated in FIG. 9A includes a tank holder unit H1003 and a recording element unit H1002. The tank holder unit H1003 includes a tank holder H1500 and a supply path plate H1600 which are joined to each other. FIG. 9B illustrates a joining surface of the tank holder H1500, and FIG. 9C illustrates a joining surface of the supply path plate H1600. The supply path plate H1600 is provided with a groove H1601 such that the vicinity of the groove H1601 becomes a welding surface H1602 to be welded to the tank holder H1500 (see FIG. 9C). When the tank holder H1500 and the supply path plate H1600 are joined to each other, the groove H1601 functions as a supply path. As ink passes through the supply path, the ink is supplied to the recording element unit H1002. As a joining method of the tank holder H1500 and the supply path plate H1600, a method using ultrasonic welding is disclosed in Japanese Patent Application Laid-Open No. 2007-283668, and a method using laser welding is disclosed in Japanese Patent Application Laid-Open No. 2005-096422.

In the joining method disclosed in Japanese Patent Application Laid-Open No. 2007-283668, a tank holder and a supply path plate are molded from a resin material. In addition, a welding surface of the supply path plate is provided with an energy director which is a projection for uniformly welding the supply path plate and the tank holder. In this joining method, the tank holder and the supply path plate are overlapped at a predetermined position and fixed, and when ultrasonic vibration is applied from a side of the supply path plate, ultrasonic vibration is focused on the energy director. Accordingly, the resin of the tank holder and the supply path plate in the vicinity of the energy director is melted, such that the tank holder and the supply path plate are welded to each other. As a result, a supply path is completed.

On the other hand, in the joining method disclosed in Japanese Patent Application Laid-Open No. 2005-096422, a supply path plate is molded from a resin material which has a property of being transparent to a laser beam, and a tank holder is molded from a resin material which has a property capable of absorbing a laser beam. In this joining method, the tank holder and the supply path plate are overlapped at a predetermined position to be fixed, and the vicinity of a supply path is irradiated with the laser beam from a side of the supply path plate. Then, a surface of the tank holder irradiated with the laser beam is heated and melted, such that the tank holder and the supply path plate are welded to each other. As a result, an ink supply member having the supply path is completed.

The above-mentioned ink supply member (liquid supply member) is generally produced by mold forming in which resin is flown into a mold to be formed. On a surface of the ink supply member produced by mold forming, typically, unevenness of about 0.1 to 10 µm exists. When the unevenness exists, small bubbles are easily generated during filling of ink and thus are obstacles to enhancement of ink filling ability. Moreover, the enhancement of ink filling ability mentioned here is to suppress small bubbles from being incorporated into ink and reaching a discharge port when the ink is filled in the entire supply path.

When the ink filling ability is degraded, small bubbles easily reach the discharge port of an ink discharge part during printing, so that there is a possibility that printing errors frequently occur. To prevent this, it is thought that the unevenness of a surface of the mold is formed to be equal to or smaller than 0.1 µm to reduce a surface roughness of the ink supply member and suppress the generation of bubbles. However, in this case, adhesion between the mold surface and the ink supply member is increased. Therefore, when the ink supply member is separated from the mold, the ink supply member may be damaged, and there is a concern that the supply path having a desired shape cannot be formed with high precision.

SUMMARY OF THE INVENTION

An object of the invention is to provide a liquid supply member in which a supply path is formed with good precision and thus printing errors are reduced, a manufacturing method thereof, a liquid discharge head, and a manufacturing method thereof.

In order to accomplish the object, according to an aspect of the invention, there is provided a liquid supply member for supplying a liquid to a liquid discharge head having a discharge port which discharges a liquid, including: a first member consisting of a resin material; a second member consisting of a resin material; and a supply path formed by joining the first member and the second member to each other, the supplying path supplying a liquid to the liquid discharge head, wherein at least a part of an internal surface of the supply path is a smooth surface smoothed by melting the resin after being molded.

In order to accomplish the object, according to another aspect of the invention, there is provided a manufacturing method of a liquid supply member including a supply path for supplying a liquid to the liquid discharge head which has a discharge port for discharging a liquid, the manufacturing method including: providing a first member consisting of a resin material and a second member consisting of a resin material, at least one of the first member and the second member having a groove which serves as the supply path; and forming the supply path by joining the first member and the second member to each other so that the groove is inside, wherein a smooth surface is formed by melting at least a part of a surface which becomes an internal surface before the forming the supply path or during the forming the supply path.

In order to accomplish the object, according to another aspect of the invention, there is provided a liquid discharge head for discharging a liquid including: a discharge port for discharging a liquid; and a liquid supply member which has a supply path for supplying the liquid to the discharge port, the supply path being formed by joining a first member consisting of a resin material to a second member consisting of a resin material, wherein at least a part of an internal surface of the supply path is a smooth surface smoothed by melting the resin after being molded.

In order to accomplish the object, according to another aspect of the invention, there is provided a manufacturing method of a liquid discharge head for discharging a liquid, the liquid discharge head having a discharge port for discharging a liquid and a liquid supply member having a supply path for supplying a liquid to the discharge port, the method including: providing a first member consisting of a resin material and a second member consisting of a resin material, at least one of the first member and the second member having a groove which serves as the supply path; and forming the supply path by joining the first member and the second member to each other so that the groove is inside, wherein a smooth surface is formed by melting at least a part of a surface which becomes an internal surface of the supply path before the forming the supply path or during the forming the supply path.

According to the aspect of the invention, the smooth surface in which unevenness is suppressed is formed by melting the resin at the part which becomes the internal surface of the supply path of the first and second members after performing molding of the first and second members. Accordingly, smoothness of the internal surface of the supply path is enhanced without use of a mold surface having low unevenness. Therefore, the supply path can be formed with good precision and thus printing errors can be reduced.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

As a liquid discharge head according to an embodiment of the invention, an ink jet recording head for discharging ink will be described. In addition, as a liquid supply member according to the embodiment of the invention, an ink supply member for supplying ink to the ink jet recording head will be described.

Figure 1A:
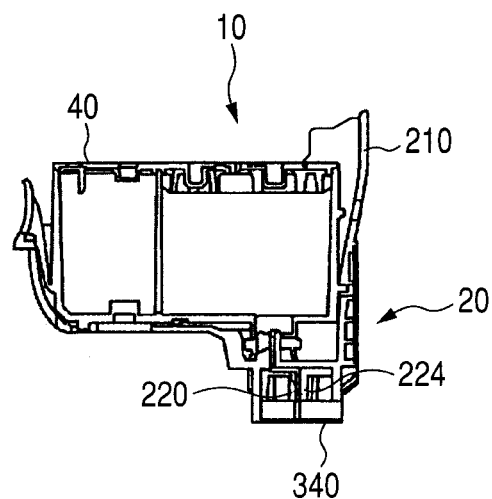
FIGS. 1A and 1B are diagrams illustrating a liquid discharge recording head according to an embodiment of the invention.
Figure 1B:
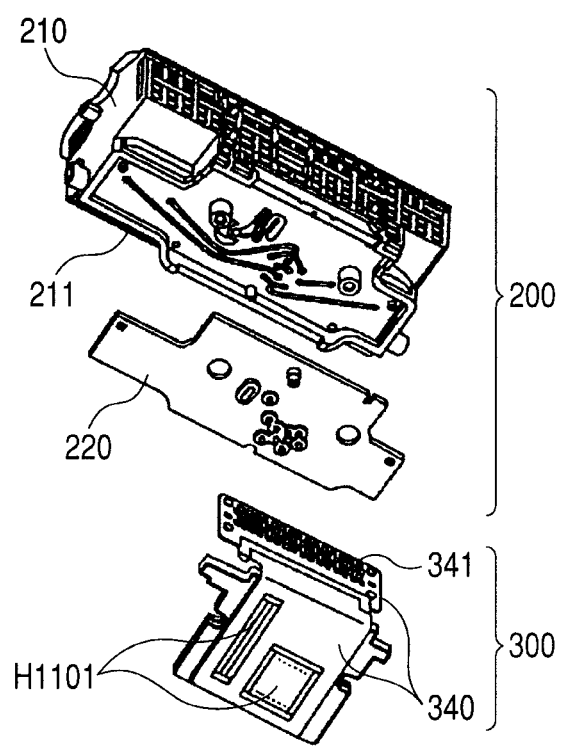

FIGS. 1A and 1B are diagrams illustrating the liquid discharge head according to the embodiment of the invention. FIG. 1A is a cross-sectional view illustrating a state where the ink jet recording head 20 as the liquid discharge head according to the embodiment of the invention is mounted to a recording head cartridge 10. FIG. 1B is an exploded perspective view of the ink jet recording head 20.

As illustrated in FIG. 1A, the recording head cartridge 10 includes the ink jet recording head 20 and a tank 40 which is provided to be attached to or detached from the ink jet recording head 20 and can accommodate ink. The recording head cartridge 10 can be attached to or detached from a cartridge (not shown) which is installed in an ink jet recording apparatus body (not shown, and hereinafter, referred to as a recording apparatus body).

The ink jet recording head 20 includes, as illustrated in FIG. 1B, a recording element unit 300, which includes an electrical wiring board 340 and a recording element substrate H1101, and a tank holder unit 200. In the ink jet recording head 20, as a recording element is driven in response to an electrical signal transmitted from the recording apparatus body, ink supplied from the tank 40 is discharged from a discharge port provided in the recording element substrate H1101. Moreover, examples of the recording element may include a heat generating resistive element and a piezo element, and in this embodiment, the heat generating resistive element is used.

First, the recording element unit 300 will be described.

The recording element unit 300 includes, as illustrated in FIG. 1B, the electrical wiring board 340 and the recording element substrate H1101. The electrical wiring board 340 has a connection terminal 341 which is electrically connected to the recording apparatus body, an electrode terminal (not shown) which is electrically connected to the recording element substrate H1101, wiring (not shown) which connects the connection terminal 341 to the electrode terminal, and an opening portion in which the recording element substrate H1101 is fitted. Connection between the electrical wiring board 340 and the recording element substrate H1101 is, for example, performed as follows. A thermosetting resin having conductivity is applied to an electrode portion of the recording element substrate H1101 and the electrode terminal of the electrical wiring board 340, and the electrode portion and the electrode terminal are heated and pressured simultaneously by a heat tool to be electrically connected. Moreover, the electrical connection portion of the electrode portion and the electrode terminal is sealed by a sealant to be protected from corrosion due to ink or external blows.

Figure 2:
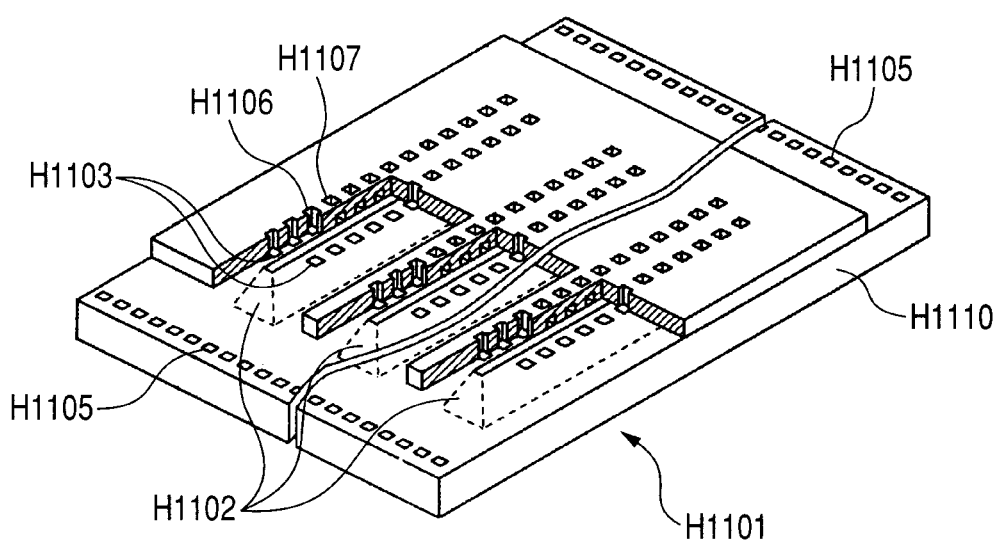
FIG. 2 is a perspective view illustrating a configuration of a recording element substrate provided in an ink jet recording head shown in FIGS. 1A and 1B.

FIG. 2 is a perspective view illustrating a configuration of the recording element substrate H1101 which is an ink discharge part provided in the ink jet recording head 20. In FIG.

2, for easy understanding of the configuration of the recording element substrate H1101, the inside thereof is partially exposed.

As illustrated in FIG. 2, the recording element substrate H1101 has a silicon substrate H1110 and a discharge port formation member 1106 which is provided in the silicon substrate H1110. The silicon substrate H1110 has a thickness of 0.5 mm to 1.0 mm and is provided with an ink supply port H1102 formed by anisotropic etching. In addition, a heat generating resistive element H1103 is formed on the silicon substrate H1110. In the discharge port formation member H1106, a discharge port H1107 which is opposed to the heat generating resistive element H1103 is formed using a photo-lithography technique. In addition, on the silicon substrate H1110, a bump H1105 is provided which is made of metal and is an electrode portion for supplying an electrical signal or power to drive the heat generating resistive element H1103.

Next, the tank holder unit 200 will be described.

The tank holder unit 200 has a tank holder 210 for holding the tank 40, a first member 211 formed integrally with the tank holder 210, and a second member 220 which is joined to the first member 211 (see FIG. 1B). In the tank holder unit 200, ink accommodated in the tank is supplied to the recording element substrate H1101 through a supply path formed between the first member 211 and the second member 220. As the first member 211 and the second member 220 are joined to each other, an ink supply member having the supply path is formed, and the ink supply member is positioned between the tank 40 and the recording element substrate H1101. Moreover, in this embodiment, the first member 211 is molded integrally with the tank holder 210. However, they may be molded individually and mounted to each other.

Here, the joining state of the first member 211 and the second member 220 will be described in detail.

Figure 3A:
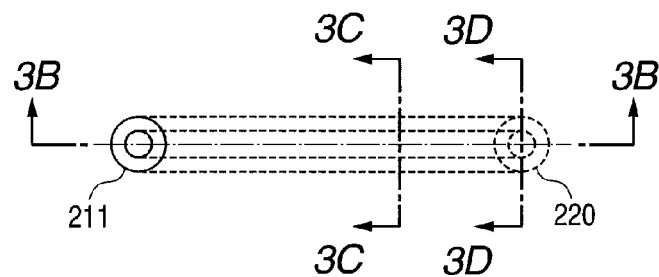
FIGS. 3A, 3B, 3C and 3D are diagrams illustrating a state where a first member and a second member are joined to each other according to a first embodiment.
Figure 3B:
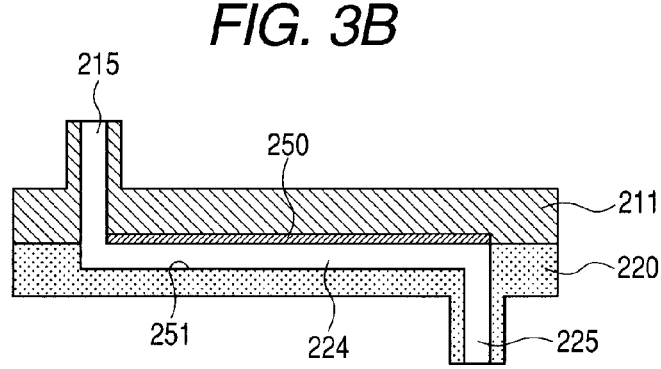
Figure 3C:
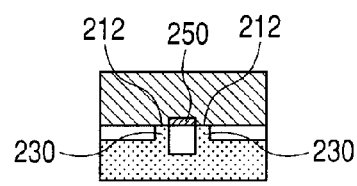
Figure 3D:
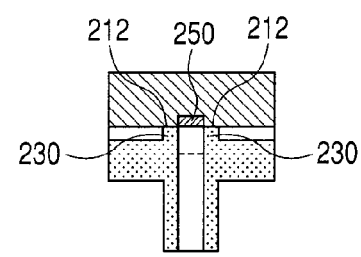

FIGS. 3A to 3D are diagrams illustrating the joining state of the first member 211 and the second member 220 according to this embodiment. Moreover, in FIGS. 3A to 3D, the joining state of only a single supply path is enlarged and illustrated. FIG. 3A is a top view seen from the first member 211, and FIGS. 3B, 3C, and 3D are cross-sectional views respectively taken along the section lines 3B-3B, 3C-3C, and 3D-3D of FIG. 3A.

As illustrated in FIG. 3B, according to this embodiment, in the first member 211, a first opening path 215 which is communicated with the tank 40 and through which ink flows, and a smooth surface 250 are provided. The first opening path 215 extends along a thickness direction of the first member 211. On the other hand, in the second member 220, a groove 251 which is opposed to the smooth surface 250, and a second opening path 225 which is communicated with the ink supply port H1102 of the recording element substrate H1101 and through which the ink flows out are provided. The second opening path 225 extends along a thickness direction of the second member 220. In addition, in the second member 220, an energy director 230 is provided (see FIGS. 3C and 3D). As the first member 211 and the second member 220 are joined to each other, between the two, a supply path 224 which connects the first opening path 215 to the second opening path 225, and a welding surface 212 which is adjacent to the supply path 224 are formed. The smooth surface 250 forms a part of the internal surface of the supply path 224.

Next, the main point of a manufacturing method of the ink supply member according to this embodiment will be described.

Figure 4A:
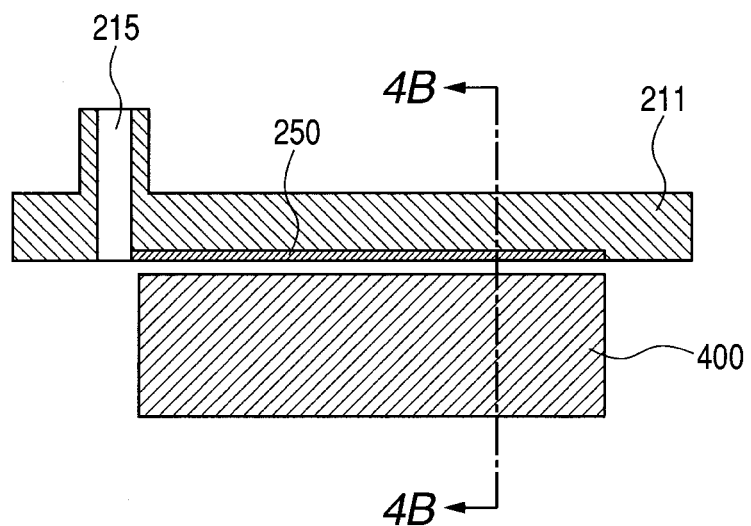
FIGS. 4A and 4B are cross-sectional views illustrating a formation method of a smooth surface according to the first embodiment.
Figure 4B:
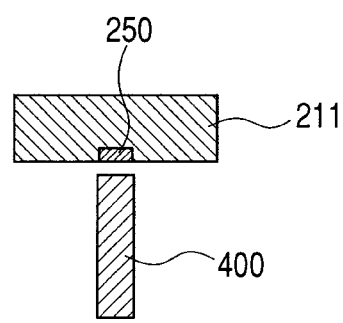

First, in the first member 211 before being joined to the second member 220, the smooth surface 250 is formed on a surface which becomes the internal surface of the supply path 224. FIGS. 4A and 4B are cross-sectional views illustrating a formation method of the smooth surface 250. FIG. 4A is, similar to FIG. 3B, a cross-sectional view taken along the section line 3B-3B of FIG. 3A, and FIG. 4B is a cross-sectional view taken along the section line 4B-4BE of FIG. 4A.

As illustrated in FIGS. 4A and 4B, when a heat horn 400 approaches the surface which becomes the internal surface of the supply path 224 of the first member 211 before being joined and radiation heat is applied to the surface for heating, the resin of the heated surface is melted. Since the first member 211 is produced by molding forming, unevenness of about 0.1 to 10 μm exists thereon before being heated by the heat horn 400. However, as a result of melting and solidifying the surface after the molding, a swell of about 0.1 mm occurs. However, the unevenness is smoothed to be equal to or smaller than 0.1 μm. After the smooth surface 250 is formed as described above, the first member 211 and the second member 220 are brought into contact with each other by pressurizing so that a side having the surface which becomes the internal surface of the supply path 224 of the first member 211 and a surface having the groove 251 of the second member 220 are on the inside. In this state, when ultrasonic vibration is applied from the side of the second member 220, the resin in the vicinity of the energy director 230 is melted, thereby forming the welding surface 212 (see FIGS. 3C and 3D). Accordingly, the first member 211 and the second member 220 are joined to each other to complete the supply path 224. Thereafter, the recording element substrate H1101 is mounted to the second member 220 so that ink which flows out from the second opening path 225 is supplied to the ink supply port H1102. Accordingly, ink accommodated in the tank 40 can be discharged from the recording element substrate H1101 through the supply path 224. Other processes than the process described above may use existing processes to produce the ink jet recording head 20, so that detailed description thereof will be omitted.

The effect of the embodiment of the invention will be described by comparing the ink jet recording head 20 produced as described above to a conventional ink jet recording head without the smooth surface 250 being formed.

Figure 5A:
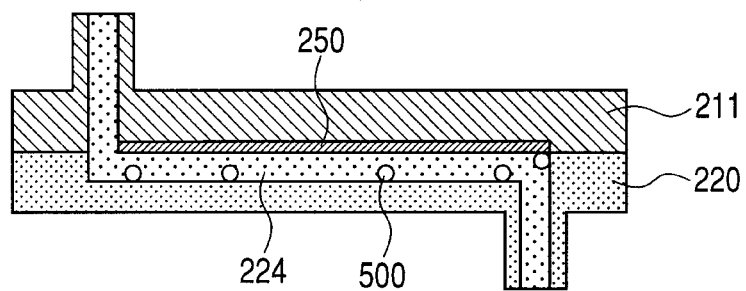
FIGS. 5A, 5B and 5C are diagrams illustrating a state of an inside of a supply path immediately after ink flows into the supply path according to the first embodiment.
Figure 5B:
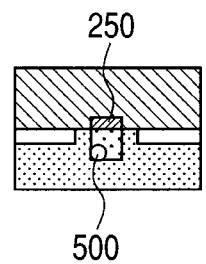
Figure 5C:
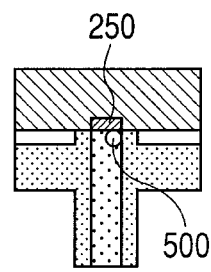
Figure 6A:
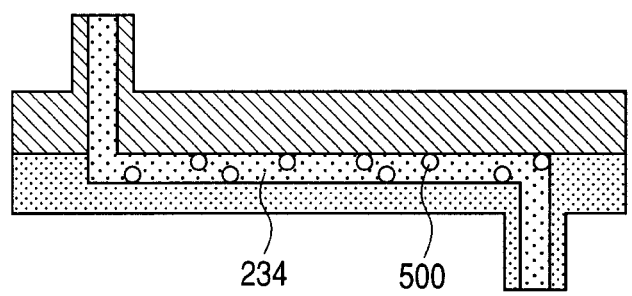
FIGS. 6A, 6B and 6C are diagrams illustrating a state of an inside of an exiting supply path immediately after ink flows into the supply path.
Figure 6B:
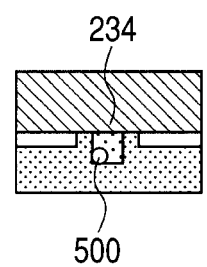
Figure 6C:
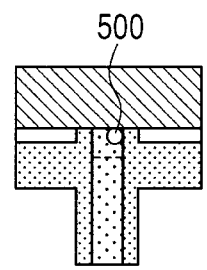

FIGS. 5A to 5C are cross-sectional views illustrating a state of the inside of the supply path 224 immediately after ink flows into the supply path 224 according to this embodiment and respectively correspond to FIGS. 3B to 3D. In addition, FIGS. 6A to 6C are cross-sectional views illustrating a state of the inside of a conventional supply path 234 immediately after ink flows into the supply path 234 without the smooth surface 250 being formed and respectively correspond to FIGS. 5A to 5C.

As illustrated in FIG. 5A, in the supply path 224 according to this embodiment of the invention, small bubbles 500 rarely occur on the smooth surface 250. On the other hand, as illustrated in FIG. 6A, in the existing supply path 234, small bubbles 500 occur over the entire surface. This is because the smooth surface 250 in the internal surface of the supply path 224 according to this embodiment of the invention has higher smoothness than other surfaces and thus it is difficult for small bubbles 500 to form.

In the existing supply path 234 without the smooth surface 250 being formed, when ink flows, small bubbles 500 occur more frequently than in the supply path 224 according to this embodiment of the invention. Therefore, for example, in a case where printing for shipping inspection is performed by filling ink in the supply path once and thereafter the ink is removed from the supply path for shipping of the recording apparatus, if the unevenness on the surface of the supply path is significant, ink is more likely to remain. When the surface of the supply path is hydrophobized due to the remaining ink, there is a concern that ink filling ability is degraded. In the ink jet recording head with the degraded ink filling ability, small bubbles reach the discharge port of the ink discharge part and become causes of non-discharge and discharge deviation. In addition, when the small bubbles are left while being incorporated into the supply path, bubbles are grown from the small bubbles and block the supply path, so that the bubbles need to be removed by a suction recovery operation or the like, thereby resulting in an increase in amount of ink wasted. For this, according to this embodiment, by forming the smooth surface 250, unevenness of the internal surface of the supply path 224 is suppressed and thus smoothness can be enhanced. Accordingly, the generation of the small bubbles 500 inside the supply path 224 can be suppressed, so that printing errors can be reduced and the amount of ink wasted can be suppressed.

Moreover, according to this embodiment, the supply path 224 is formed by forming the groove 251 in the second member 220. However, a space at which the groove is formed is not limited only to the second member 220, and may be provided in the first member 211. Otherwise, the groove may be formed in both the first member 211 and the second member 220.

In addition, according to this embodiment, radiation heat is applied from the heat horn 400 directly to the first member 211 thereby forming the smooth surface 250. However, in this embodiment of the invention, a Teflon tape having smoothness may be nipped between the heat horn 400 and the first member 211 to form the smooth surface 250.

In addition, according to this embodiment, the flat surface 250 is formed only in the first member 211 within the internal surface of the supply path 224; however, the smooth surface 250 may also be formed in the internal surface of the groove 251 of the second member 220. In addition, according to this embodiment, the smooth surface 250 is formed only on the surface which becomes the internal surface of the supply path 224 of the first member 211. However, the smooth surface may also be formed on a surface other than the surface which becomes the internal surface of the supply path 224.

Second Embodiment

A liquid discharge head according to this embodiment has the same configuration as that of the ink jet recording head 20 described in the first embodiment except that a formation method of the above-mentioned smooth surface 250 is different. Accordingly, like elements in the same configuration as that of the ink jet recording head 20 are denoted by like reference numerals, and detailed description thereof will be omitted.

According to this embodiment, the smooth surface 250 is formed by irradiating the first member 211 from the side of the second member 220 with a laser beam instead of the heat horn 400. As the first member 211, a resin material which has a property capable of absorbing a laser beam, for example, "Product No. SE1X" (produced by SABIC) which is a black noryl containing a dye or a pigment which absorbs a laser beam is used.

On the other hand, as the second member 220, a resin material is used which has a property of being transparent to a laser beam, for example, a transparent noryl "Product No. TPN9221" (produced by SABIC). Alternatively, as the second member 220, "Product No. TN300" (produced by SABIC) may be used which is a transparent noryl without a color material contained. Here, a noryl collectively refers to modified polyphenylene ether and modified polyphenylene oxide. The noryl is formed by modifying polyphenylene ether (modified polyphenylene oxide) to enhance heat resistance and strength, and belongs to thermoplastic resin and has properties of being strongly resistant to acid and alkali.

Moreover, according to the embodiments of the invention, having a property of being transparent to a laser beam means that transmittance is equal to or higher than 30% when a member having a thickness of 2.0 mm is irradiated with the laser beam. In addition, absorbing a laser beam means that absorbance is equal to or higher than 90% when a member having a thickness of 2.0 mm is irradiated with the laser beam.

Figure 7A:
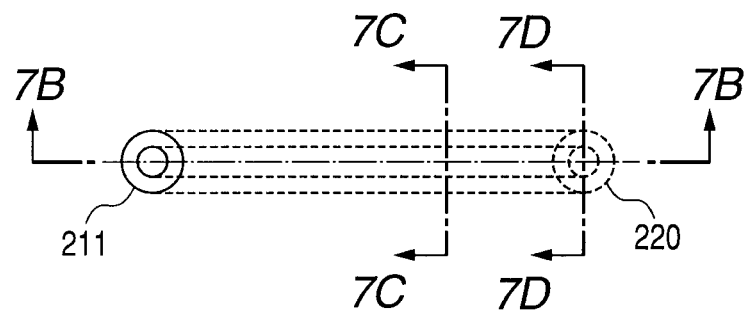
FIGS. 7A, 7B, 7C and 7D are diagrams illustrating a formation method of a smooth surface according to a second embodiment.
Figure 7B:
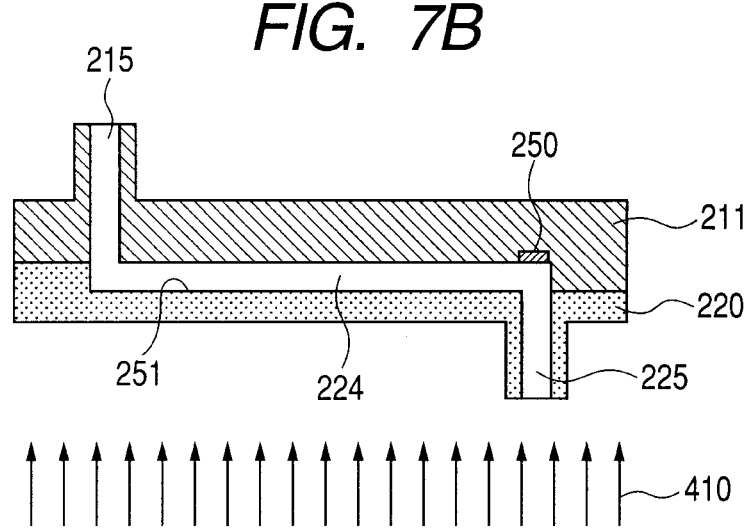
Figure 7C:
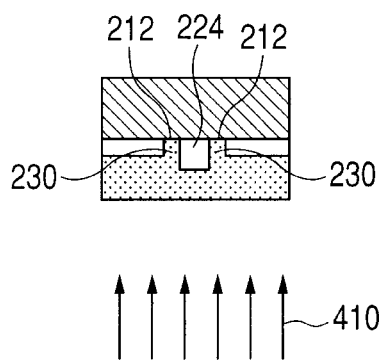
Figure 7D:
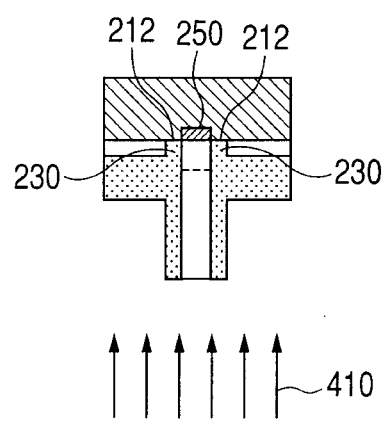

FIGS. 7A to 7D are diagrams illustrating a formation method of the smooth surface according to this embodiment. FIG. 7A is a top view illustrating the state where the first member 211 and the second member 220 according to this embodiment are joined to each other, as viewed from the first member 211, and FIGS. 7B, 7C, and 7D are cross-sectional views respectively taken along the section lines 7B-7B, 7C-7C, and 7D-7D of FIG. 7A.

According to this embodiment, first, the first member 211 and the second member 220 are brought into contact with each other by pressurizing. Subsequently, as illustrated in FIG. 7B, a laser beam 410 is irradiated from the side of the second member 220 along the second opening path 225. Here, when the energy director 230 is irradiated with the laser beam 410, the resin in the vicinity of the energy director 230 is melted and thus the welding surface 212 is formed (see FIGS. 7C and 7D). Accordingly, the supply path 224 is completed between the first member 211 and the second member 220. In addition, when the entire supply path 224 is irradiated with the laser beam 410, the smooth surface 250 is formed only at a part of the surface of the first member 211 which is joined to the second member 220 and corresponds to an opening of the second opening path 225, within the internal surface of the supply path 224 (see FIGS. 7B and 7D). The smooth surface 250 is formed only at this part because this part is directly irradiated with the laser beam 410 through the second opening path 225 and thus at this part a larger amount of heat is generated by the laser beam 410 than other parts irradiated with light transmitting the second member 220.

According to this embodiment, even the supply path 224 which is not typically a range to be irradiated with a laser beam is irradiated with a laser beam. Accordingly, within the internal surface of the supply path 224, the smooth surface 250 is formed at the part of the surface of the first member 211 joined to the second member 220 corresponding to the opening of the second opening path 225. As the unevenness at this part is more significant, small bubbles generated in the recording element unit 300 are easily collected by buoyancy. However, according to this embodiment, by forming the smooth surface 250, smoothness of this part can be enhanced. Accordingly, a structure is configured in which small bubbles are less likely to be collected. Therefore, small bubbles generated in the recording element unit 300 are prevented from blocking the supply path 224.

In addition, according to the first embodiment, the supply path 224 is formed after forming the smooth surface 250. However, according to this embodiment, during the formation process of forming the supply path 224 by joining the first member 211 and the second member 220 to each other, the smooth surface 250 is formed. Therefore, manufacturing time can be reduced.

Third Embodiment

A liquid discharge head according to this embodiment is subjected to the same formation method of the smooth surface 250 as in the second embodiment and has the same configuration as that of the ink jet recording head 20 described in the first embodiment except that the shape of the above-mentioned second opening path 225 is different. Accordingly, like elements in the same configuration as that of the ink jet recording head 20 are denoted by like reference numerals, and detailed description thereof will be omitted.

According to this embodiment, as in the second embodiment, as the first member 211, a resin material is used which has a property capable of absorbing the laser beam 410, and as the second member 220, a resin material is used which has a property of being transparent to the laser beam 410.

Figure 8A:
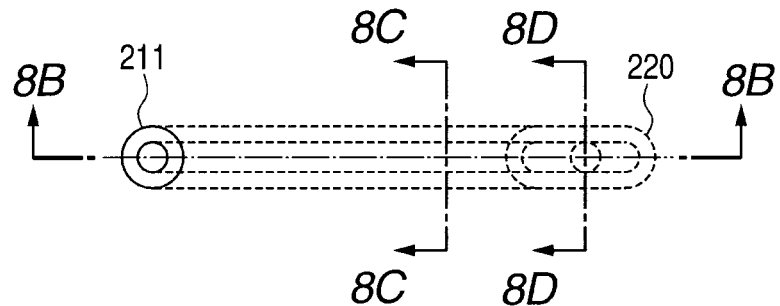
FIGS. 8A, 8B, 8C and 8D are diagrams illustrating a formation method of a smooth surface according to a third embodiment.
Figure 8B:
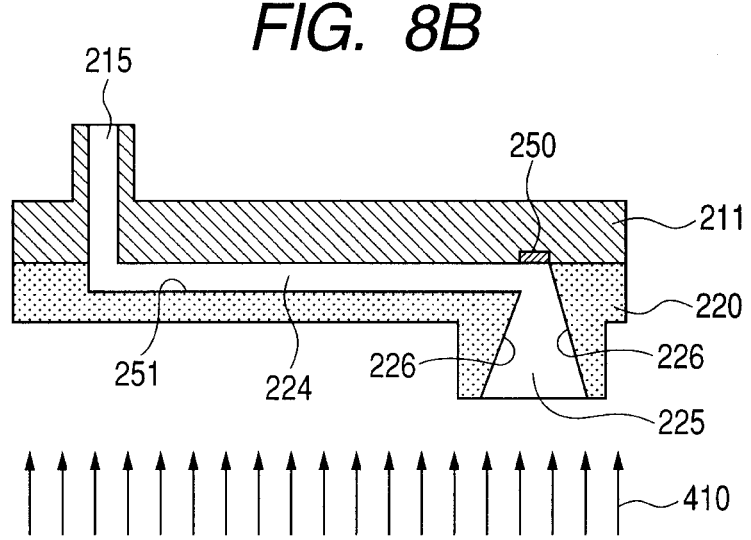
Figure 8C:
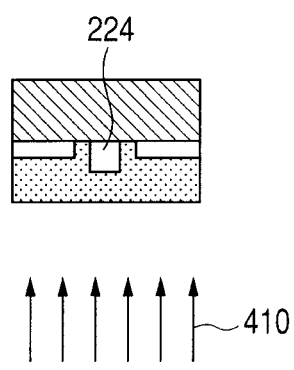
Figure 8D:
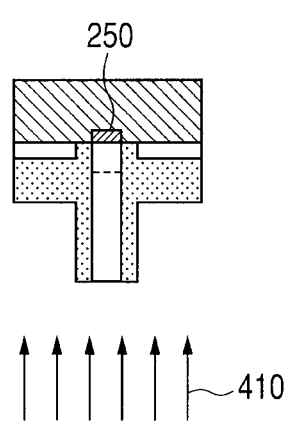
Figure 9A:
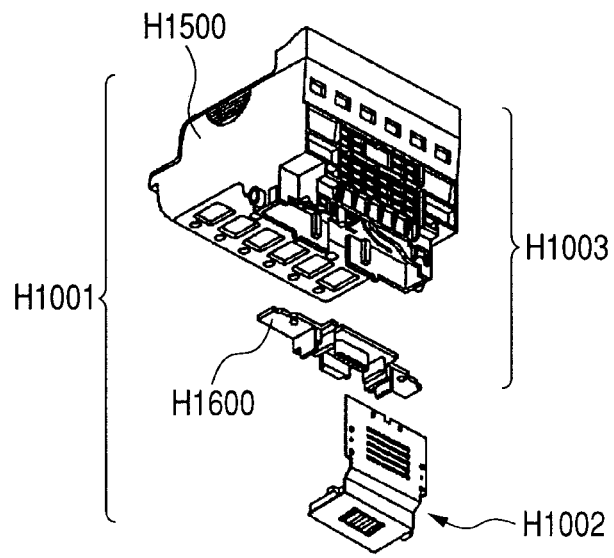
FIGS. 9A, 9B, and 9C are diagrams illustrating a configuration of a conventional ink jet recording head.
Figure 9B:
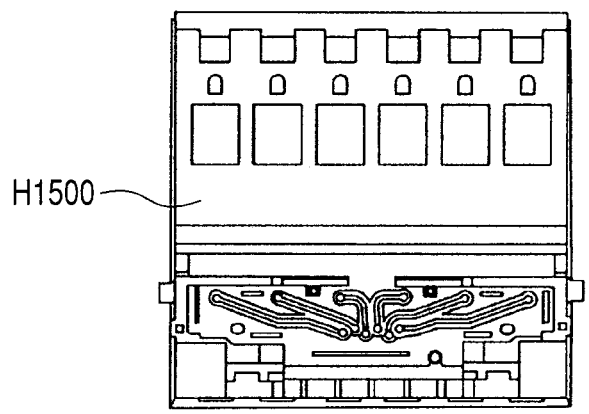
Figure 9C:
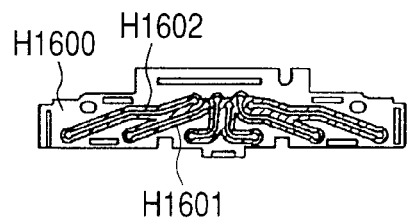

FIGS. 8A to 8D are diagrams for describing a formation method of the smooth surface according to this embodiment. FIG. 8A is a top view illustrating the state where the first member 211 and the second member 220 according to this embodiment are joined to each other, as viewed from the first member 211, and FIGS. 8B, 8C, and 8D are cross-sectional views respectively taken along the section lines 8B-8B, 8C-8C, and 8D-8D of FIG. 8A.

According to this embodiment, as in the second embodiment, the first member 211 and the second member 220 are brought into contact with each other by pressurizing, and the laser beam 410 is irradiated from the side of the second member 220 (see FIG. 8B). Then, as described above according to the second embodiment, the supply path 224 and the smooth surface 250 are simultaneously formed. Here, the smooth surface 250 is formed at a part of the surface of the first member 211 which is joined to the second member 220 and corresponds to the opening of the second opening path 225 within the internal surface of the supply path 224. According to this embodiment, in the second opening path 225, for the reason of an increase in the amount of ink supplied and suppression of ink from sticking in the recording element unit 300, a tapered portion 226 is formed of which the cross-sectional area is enlarged while separating from the supply path 224 (see FIG. 8B). Since the tapered portion 226 is provided, light of the laser beam which is incident to the second opening path 225 and reflects from the tapered portion 226 is focused on the part of the surface of the first member 211 which is joined to the second member 220 and corresponds to the opening of the second opening path 225. Accordingly, the smooth surface 250 can be formed more effectively than the second embodiment.

Even in this embodiment, as in the second embodiment, the smooth surface 250 is formed during the process of forming the supply path 224 by joining the first member 211 and the second member 220 to each other. Accordingly, manufacturing time can be reduced. Moreover, in this embodiment, by forming the tapered portion 226 in the second opening path 225, the smooth surface 250 can be efficiently formed.

Fourth Embodiment

In a liquid discharge head according to this embodiment, as in the ink jet recording head 20 described according to the second embodiment, the smooth surface 250 is formed by irradiating the laser beam. However, this embodiment is different from the second embodiment in that the groove 251 which serves as the supply path 224 is formed in the first member 211. Like elements in the same configuration as that of the ink jet recording head 20 according to the above-described embodiment are denoted by like reference numerals, and detailed description thereof will be omitted.

Figure 10A:
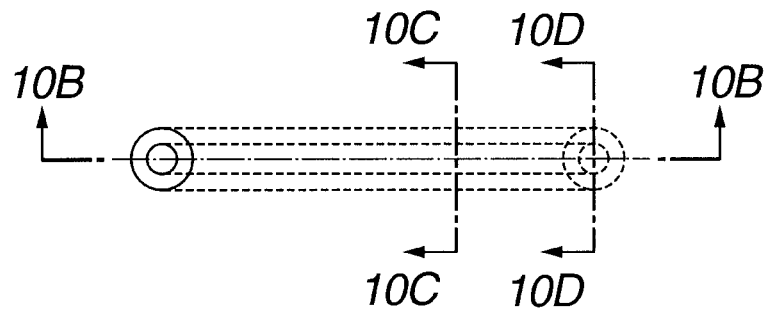
FIGS. 10A, 10B, 10C and 10D are diagrams illustrating a formation method of a smooth surface according to a fourth embodiment.
Figure 10B:
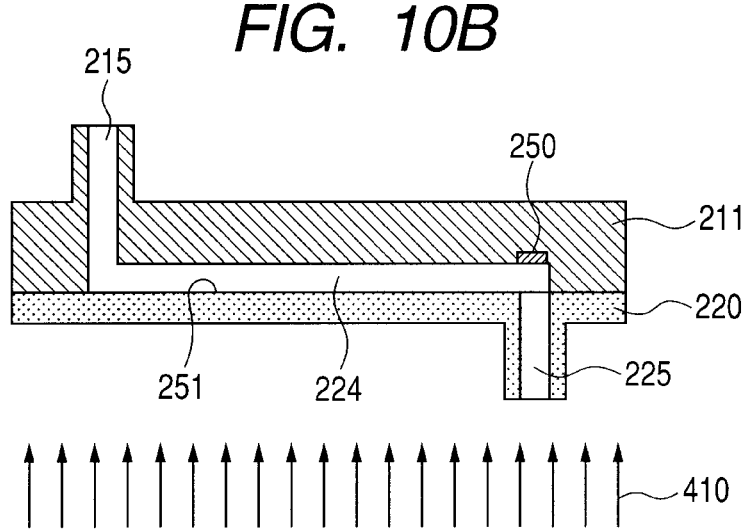
Figure 10C:
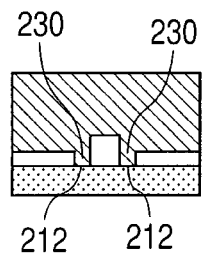
Figure 10D:
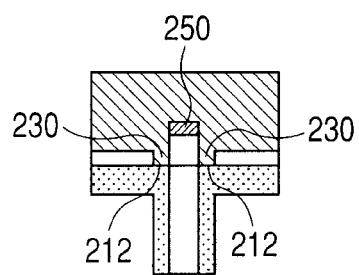
Figure 10D:
Figure 10D:

FIGS. 10A to 10D are diagrams illustrating a formation method of the smooth surface according to this embodiment. FIG. 10A is a top view illustrating the state where the first member 211 and the second member 220 according to this embodiment are joined to each other, as viewed from the first member 211, and FIGS. 10B, 10C, and 10D are cross-sectional views respectively taken along the section lines 10B-10B, 10C-10C, and 10D-10D of FIG. 10A.

According to this embodiment, the first member 211 and the second member 220 are brought into contact with each other by pressurizing, and the laser beam 410 is irradiated from the side of the second member 220 (see FIG. 10B). Then, the resin in the vicinity of the energy director 230 is melted and thus the welding surface 212 is formed (see FIGS. 10C and 10D). Accordingly, the supply path 224 is formed between the first member 211 and the second member 220, and the smooth surface 250 is formed in the internal surface of the supply path 224. Here, although the smooth surface 250 is formed in the internal surface of the supply path 224, the smooth surface 250 is formed at a part of a surface which is different from the surface of the first member 211 that is joined to the second member 220 and which corresponds to the opening of the second opening path 225.

As the smooth surface 250 and the melting surface 212 are formed in different surfaces, intensities of the laser beam irradiated to be received by the surfaces can be changed. If meltability of the melting surface 212 is to be enhanced, the intensity of the laser beam irradiated to the melting surface 212 may be increased. If smoothness of the smooth surface 250 is to be enhanced, the intensity of the laser beam irradiated to the smooth surface 250 may be increased. Accordingly, compared to the second and third embodiments, the degrees of freedom of the smooth surface 250 and the meltability of the melting surface 212 can be increased.

According to this embodiment, as in the second embodiment, the second opening path 225 has a straight shape. However, as in the third embodiment, a tapered portion may also be provided.

Even in this embodiment, as in the second embodiment, the smooth surface 250 is formed during the process of forming the supply path 224 by joining the first member 211 and the second member 220 to each other. Accordingly, manufacturing time can be reduced. Moreover, as in this embodiment, the smooth surface 250 may not be formed during the process of forming the supply path 224 and the smooth surface 250 may also be formed independently from the process of forming the supply path 224.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-262998, filed Nov. 18, 2009, which is hereby incorporated by reference herein in its entirety.

What is claimed is:

1. A liquid supply member comprising:
a first member having a property capable of absorbing a laser beam;
a second member having a property of being transparent to a laser beam; and
a supply path formed by joining the first member and the second member to each other, the supply path supplying a liquid to a liquid discharge head,
wherein a part of an internal surface of the supply path formed in the first member, which corresponds to an opening of the supply path in the second member along a joined surface where the first member and the second member are joined, is a smooth surface smoothed by melting the first member after molding the first member and the second member, and wherein the smooth surface is formed in a surface different from the joined surface in a direction vertical to the joined surface.

2. The liquid supply member according to claim 1, wherein the opening of the supply path formed in the second member has a tapered portion of which a cross-sectional area increases in a direction away from the first member.

3. A liquid discharge head for discharging a liquid comprising:

a discharge port for discharging a liquid; and a liquid supply member which has a supply path for supplying a liquid to the discharge port, the supply path being formed by joining a first member having a property capable of absorbing a laser beam and a second member having a property of being transparent to a laser beam, wherein a part of an internal surface of the supply path formed in the first member, which corresponds to an opening of the supply path in the second member along a joined surface where the first member and the second member are joined, is a smooth surface smoothed by melting the first member after molding the first member and the second member, and wherein the smooth surface is formed in a surface different from the joined surface in a direction vertical to the joined surface.

4. A manufacturing method of a liquid supply member including a supply path for supplying a liquid to a liquid discharge head which has a discharge port for discharging the liquid, the manufacturing method comprising:

providing a first member having a groove which forms the supply path and a second member; and forming the supply path by irradiating the first member from a side of the second member with a laser beam and joining the first member and the second member to each other so that the groove is inside, wherein a part of an internal surface of the supply path formed in the first member, which corresponds to an opening of the supply path in the second member along a joined surface where the first member and the second member are joined, is a smooth surface smoothed by irradiating with the laser beam during the forming of the supply path, and wherein the smooth surface is formed in a surface different from the joined surface in a direction vertical to the joined surface.

5. A manufacturing method of a liquid discharge head for discharging a liquid, the liquid discharge head having a discharge port for discharging the liquid and a liquid supply member having a supply path for supplying the liquid to the discharge port, the method comprising:

providing a first member having a groove which forms the supply path and a second member; and forming the supply path by irradiating the first member from a side of the second member with a laser beam and joining the first member and the second member to each other so that the groove is inside, wherein a part of an internal surface of the supply path formed in the first member, which corresponds to an opening of the supply path in the second member along a joined surface where the first member and the second member are joined, is a smooth surface smoothed by irradiating with the laser beam during the forming of the supply path, and wherein the smooth surface is formed in a surface different from the joined surface in a direction vertical to the joined surface.

* * * * *